United States Patent
Himmel et al.

(10) Patent No.: US 6,408,316 B1
(45) Date of Patent: Jun. 18, 2002

(54) BOOKMARK SET CREATION ACCORDING TO USER SELECTION OF SELECTED PAGES SATISFYING A SEARCH CONDITION

(75) Inventors: Maria Azua Himmel, Austin; Edward Lawrence Kunzinger, III; Kelvin Roderick Lawrence, both of Round Rock; Herman Rodriguez; Jay Allen Tunkel, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,844

(22) Filed: Dec. 17, 1998

(51) Int. Cl.$^7$ .............................................. G06F 15/00
(52) U.S. Cl. .................. 707/501.1; 707/10; 707/104.1; 709/245; 709/203; 345/760
(58) Field of Search ................................ 707/501, 513, 707/104, 3, 5, 10, 501.1, 104.1; 705/27; 709/245, 203, 218; 345/335, 357, 760, 744

(56) References Cited

U.S. PATENT DOCUMENTS

| | | | |
|---|---|---|---|
| 5,640,553 A | | 6/1997 | Schultz ........................ 395/605 |
| 5,659,732 A | | 8/1997 | Kirsch ......................... 395/605 |
| 5,715,443 A | | 2/1998 | Yanagihara et al. ........ 395/603 |
| 5,873,076 A | * | 2/1999 | Barr et al. ...................... 707/3 |
| 5,917,491 A | * | 6/1999 | Bauersfeld .................. 345/352 |
| 5,918,014 A | * | 6/1999 | Robinson ..................... 706/12 |
| 5,978,818 A | * | 11/1999 | Lin ............................ 707/501 |

(List continued on next page.)

OTHER PUBLICATIONS

Kosmynin, From Bookmark Managers to Distributed Indexing: An Evolutinary Way to the Next Generation of Search Engines, IEEE communication Magazine, Jun. 1997, pp. 146–151.*

Rucker and Polanco, Personalized Navigation for the web, Comminication of the ACM, Mar. 1997, pp. 73–75.*

Thomas and Fischer, Using Agents to Personalize the Web, ACM 1997, pp. 53–60.*

Li et al., PowerBookmarks: A System for Personalizable Web Information Organization, Sharing, and Management, ACM, Aug. 1999, pp. 565–567.*

Brown et al., "Special Edition Using Netscape 2", Que Corporation 1995, pp. 214–225.*

Maarek et al., "Automatically Organizing Bookmarks per Contents", Fifth International World Wide Web Conference, May 6–10, 1996, Paris, France.*

Wide area information servers, Buhle El Jr., Pennsylvania Sch. of Med., Philadelphia, PA, USA, Digital Systems Journal, vol. 16, No. 5, pp. 13–16, Sep.–Oct. 1994.

An Adaptive short list for documents on the World Wide Web, Dehevc M; Meyer, B.; Svecko R, Maribor Univ., Slovenia, IUI97. 1997 International Conference on Intelligent User Interfaces, pp. 209–211, Published: New York, NY, USA, 1997, viii+271 pp.

Ranking and relevance feedback extensions to a view–based searching system, Smith, M.P.; Pollitt, A.S., Online Information 95. 19th International Online Information Meeting Proceedings pp.:231–40.

*Primary Examiner*—Heather R. Herndon
*Assistant Examiner*—Thu Vy Huynh
(74) *Attorney, Agent, or Firm*—Jeffrey S. LaBaw

(57) ABSTRACT

A bookmark set is created from search results. First, a search request from a client browser is sent for pages in a distributed database which satisfy a search condition. A set of pages which satisfy the search condition are returned. In the page which presents the search results, each page is associated with a user input sensitive selection means, such as a checkbox. Responsive to user input, i.e. selection of certain pages, a bookmark set comprised of a path to selected pages is created. The created bookmark set is served as a unit to the client browser.

19 Claims, 3 Drawing Sheets

U.S. PATENT DOCUMENTS

| | | | | |
|---|---|---|---|---|
| 6,012,093 A | * | 1/2000 | Maddalozzo et al. | 707/513 |
| 6,032,162 A | * | 2/2000 | Burke | 707/501 |
| 6,037,934 A | * | 3/2000 | Himmel et al. | 345/335 |
| 6,041,360 A | * | 3/2000 | Himmel et al. | 709/245 |
| 6,055,543 A | * | 4/2000 | Christensen et al. | 707/104 |
| 6,073,130 A | * | 6/2000 | Jacobson et al. | 707/5 |
| 6,081,814 A | * | 6/2000 | Mangat et al. | 707/501 |
| 6,088,707 A | * | 7/2000 | Bates et al. | 707/501 |
| 6,100,590 A | * | 8/2000 | Bates et al. | 345/357 |
| 6,101,486 A | * | 8/2000 | Roberts et al. | 705/27 |
| 6,105,021 A | * | 8/2000 | Berstis | 707/3 |
| 6,112,202 A | * | 8/2000 | Kleinberg | 707/5 |
| 6,122,647 A | * | 9/2000 | Horowitz et al. | 707/513 |
| 6,138,158 A | * | 10/2000 | Boyle et al. | 709/225 |
| 6,163,778 A | * | 12/2000 | Fogg et al. | 707/10 |
| 6,184,886 B1 | * | 2/2001 | Bates et al. | 345/357 |
| 6,189,024 B1 | * | 2/2001 | Bauersfeld et al. | 709/203 |
| 6,208,995 B1 | * | 3/2001 | Himmel et al. | 707/104 |
| 6,223,145 B1 | * | 4/2001 | Hearst | 703/22 |
| 6,223,178 B1 | * | 4/2001 | Himmel et al. | 707/10 |
| 6,243,091 B1 | * | 6/2001 | Berstis | 345/349 |
| 6,256,639 B1 | * | 7/2001 | Himmel et al. | 707/104.1 |
| 6,314,423 B1 | * | 11/2001 | Himmel et al. | 707/10 |
| 6,324,566 B1 | * | 11/2001 | Himmel et al. | 345/854 |

* cited by examiner

BOOKMARK SET CREATION ACCORDING TO USER SELECTION OF SELECTED PAGES SATISFYING A SEARCH CONDITION

BACKGROUND OF THE INVENTION

This invention relates generally to information retrieval in a computer network. More particularly, it relates to an improved method for providing a set of bookmarks in a browser for retrieving Web pages in an Internet environment.

It is well known to couple a plurality of computer systems into a network of computer systems. In this way, the collective resources available within the network may be shared among users, thus allowing each connected user to enjoy resources which would not be economically feasible to provide to each user individually. With the growth of the Internet, sharing of computer resources has been brought to a much wider audience. The Internet has become a cultural medium in today's society for both information and entertainment. Government agencies employ Internet sites for a variety of informational purposes. For many companies, one or more Internet sites are an integral part of their business; these sites are frequently mentioned in the companies' television, radio and print advertising.

The World Wide Web, or simply "the Web", is the Internet's multimedia information retrieval system. It is the most commonly used method of transferring data in the Internet environment. Other methods exist such as the File Transfer Protocol (FTP) and Gopher, but have not achieved the popularity of the Web. Client machines accomplish transactions to Web servers using the Hypertext Transfer Protocol (HTTP), which is a known application protocol providing users access to files, e.g., text, graphics, images, sound, video, using a standard page description language known as the Hypertext Markup Language (HTML). HTML provides basic document formatting and allows the developer to specify "links" to other servers and files. In the Internet paradigm, a network path to a server is identified by a Uniform Resource Locator (URL) having a special syntax for defining a network connection.

Retrieval of information is generally achieved by the use of an HTML-compatible "browser", e.g., Netscape Navigator, at a client machine. When the user of the browser specifies a link via a URL, the client issues a request to a naming service to map a hostname in the URL to a particular network IP address at which the server is located. The naming service returns a list of one or more IP addresses that can respond to the request. Using one of the IP addresses, the browser establishes a connection to a server. If the server is available, it returns a document or other object formatted according to HTML. Web browsers have become the primary interface for access to many network and server services.

The entry of the URL in the entry field of a browser can be a difficult task for many users. While the URL for the main Web page of a major company can be relatively brief, e.g., www.ibm.com, subsidiary pages can have very lengthy URLs in, at least to the average user, an arcane syntax. Recognizing the difficulties involved, the developers of browsers have provided one useful means of returning to a favorite URL, by the creation of user stored "bookmarks" in the browser.

Once created, bookmarks offer a means of page retrieval. The user can cause the browser to display his bookmark list and select among his bookmarks to go directly to a favorite page. Thus, the user is not forced to enter a lengthy URL nor retrace the original tortuous route through the Internet by which he may have arrived at the Web site. Once a bookmark is added to a bookmark list, in general, the bookmark becomes a permanent part of the browser until removed. The permanence and accessibility of bookmarks have made them a valuable means for personalizing a user's Internet access through the browser.

Yet despite their usefulness, the current arrangement of bookmarks is not without its flaws. The most common way of adding bookmarks to the bookmark file or a particular bookmark folder in the browser is manually intensive. Each bookmark is added one at a time. A user visits a web site, then selects that site as a bookmark entry and, if desired, categorizes it manually. Furthermore, the current technology used in browsers to update bookmarks, i.e. removing the old address and entering the new one, is very slow and inefficient.

Another problem with retrieving information on the Internet is the amount of time required to sift through the enormous amount of information available to find the relatively few web pages or files of interest. Search engines help to a degree, however, the current methods require a user to actually retrieve a suitable web page before it can be added to the browser's list of bookmarks. A substantial amount of user time is required to refine search strategies, visit pages, compile and discard results and so forth. Thus, a good list of bookmarks on a given topic can represent a significant investment in time and effort.

These problems as well as others are addressed in various embodiments of the present invention.

SUMMARY OF THE INVENTION

Therefore, it is an object of the invention to improve the management of bookmarks in the browser.

It is another object of the invention to provide a search mechanism to create bookmark sets usable in a browser.

It is another object of the invention to select entries returned from a search to a selected bookmark set without requiring browser retrieval of an associated page.

It is another object of the invention to edit a bookmark set for a given client browser.

These and other objects are accomplished by creating a bookmark set from search results. First, a search request from a client browser is sent for pages in a distributed database which satisfy a search condition. A set of pages which satisfy the search condition are returned. In the page which presents the search results, each page is associated with a user input sensitive selection means, such as a checkbox. Responsive to user input, i.e. selection of certain pages, a bookmark set comprised of a path to selected pages is created. The created bookmark set is served as a unit to the client browser.

BRIEF DESCRIPTION OF THE DRAWINGS

These objects, features and advantages will be more readily understood with reference to the attached figures and following description.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
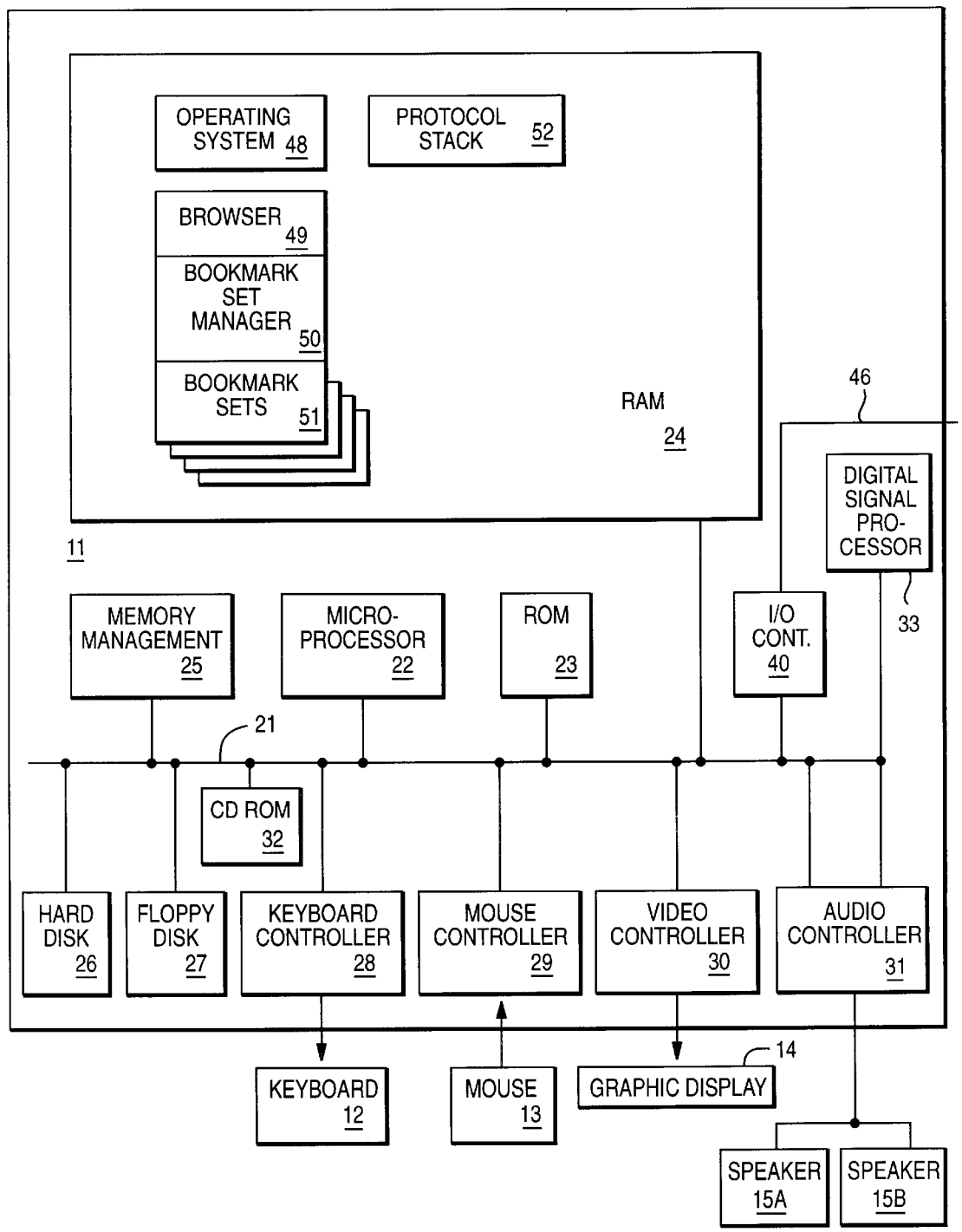
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

A web browser is a program that allows viewing the content of the Internet. A well known web browser is Netscape Navigator, however, many browsers exist. Some are general purpose and have many capabilities to provide a variety of functions. Other are less capable and special purpose. In general, a web browser is a program which is capable of parsing and presenting a document written in HTML, although those skilled in the art would appreciate that other markup languages such as dynamic HTML and XML will be used in the browsers of the future.

The idea of creating "bookmark sets" has been proposed by the inventors in copending, commonly assigned application, Ser. No. 08/977,634, Attorney Docket No. AT9-97-443 entitled "Web Browser Download of Bookmark Set", by Azua et al. filed Nov. 11, 1997, which is hereby incorporated by reference. In the referenced application, a bookmark set is associated with a web server and/or web page and downloaded to a client browser by either a push or pull operation. In some embodiments of the referenced application, the bookmark set is associated with a given web page which has already been located by the user. In other embodiments, a network administrator pushes a bookmark set as a means of controlling or guiding a set of client browsers.

In the present invention, the browser must also be equipped with a bookmark set manager, a software module which handles bookmark sets. Each bookmark set is comprised of referents, typically URLs, to various locations in the Internet as well as text descriptions of the locations. The bookmark manager is preferably part of the browser itself, but could be installed in the browser as a plug-in or Java applet. Each bookmark entry is comprised of a URL to a web page and an associated descriptive text string which describes the web page in such a way to be easily recognized by the user. The descriptive text can be entered by the user when creating the bookmark set. The typical browser default, when the user does not enter any descriptive text, is to use the text within an embedded "title" tag which is often sent as part of the HTML header. Other information such as pointers to cached copies of the web page can be included in the bookmark entry.

Figure 2:
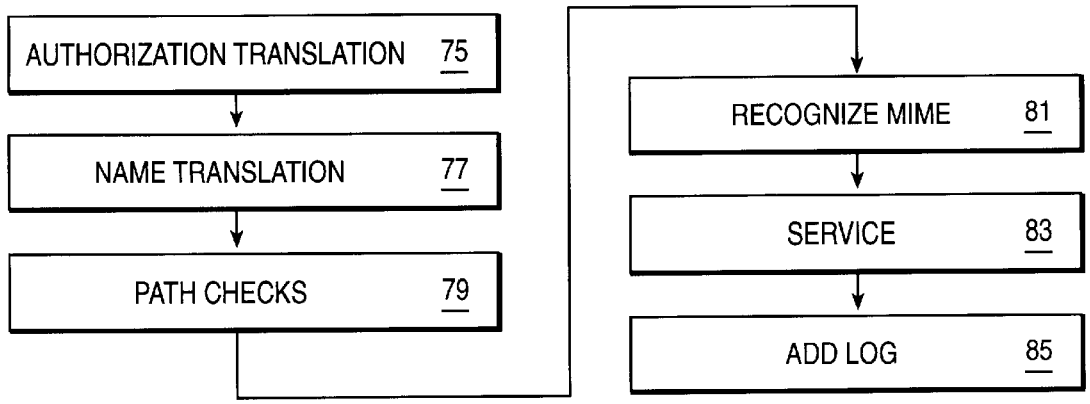
FIG. 2 depicts the processing of an HTTP request in the Internet environment.

By means of background, in the Internet, a Web server accepts a client request and returns a response back to the client. A series of server computers may be involved in the retrieval of a specific web page. The operation of the server program is governed by a number of server application functions (SAFs), each of which is configured to execute in a certain stop of a sequence. This sequence, illustrated in FIG. 2, begins with the authorization translation step 75 during which the web server translates any authorization information sent by the web client into a user and a group. If necessary, the step 75 may decode a message to get the actual client request. At the name translation step 77, the URL associated with the request may or may not be translated into a system-dependent file name, a redirection URL or a mirror site. In the path checks step 79, the server performs various tests on the resulting path to ensure that the given client may retrieve the document.

In step 81, Multipurpose Internet Mail Extension (MIME) type information, e.g., text/html, image/gif, for the given document is recognized. In the service step 83, the Web server routine selects an internal server function to send the retrieved information back to the requesting web client. This function can run the normal server service routine to return a file or some other server function, such as a program to return a custom document or a CGI program. At the Add Log step 85, information about the transaction is recorded.

A URL or "Uniform Resource Locator" is defined in RFC 1945, which is incorporated herein by reference. As is well known, the URL is typically of the format: http://somehost/somedirectory?parameters . . . " where "somehost" is the hostname position of the URL, "somedirectory" is a directory in which the web page may be found. The usual manner in which a URL is resolved into an actual IP address for a web server is through the use of a nameserver. In an internet or intranet network, a nameserver maps hostnames in URLs to actual network addresses. An example of a nameserver is the Domain Name Service (DNS) currently implemented in the Internet. The process of having a Web client request a hostname and address from a nameserver is sometimes called resolution. In TCP/IP, the nameserver resolves the hostname into a list of one or more IP addresses which are returned to the Web client on an HTTP request. Each IP address identifies a server which hosts the requested content made by the browser.

In one preferred embodiment, a bookmark set is an entity which has attributes of its own, e.g., active vs. inactive, and manages attributes and behavior, e.g., dynamic vs. static, of its individual bookmarks. Further, an action such as selection, deletion or e-mail transmission can be accomplished for the entire set in a single operation by the user. A bookmark set could be designated active in many ways. For example, a bookmark set can be activated through a browser configuration option. The browser can be configured so that a newly served bookmark automatically becomes the active bookmark set in the browser. Alternatively, a "Select active bookmark set" option in a bookmark pull down can used to specify the unique bookmark set that is active at any one session.

Figure 3:
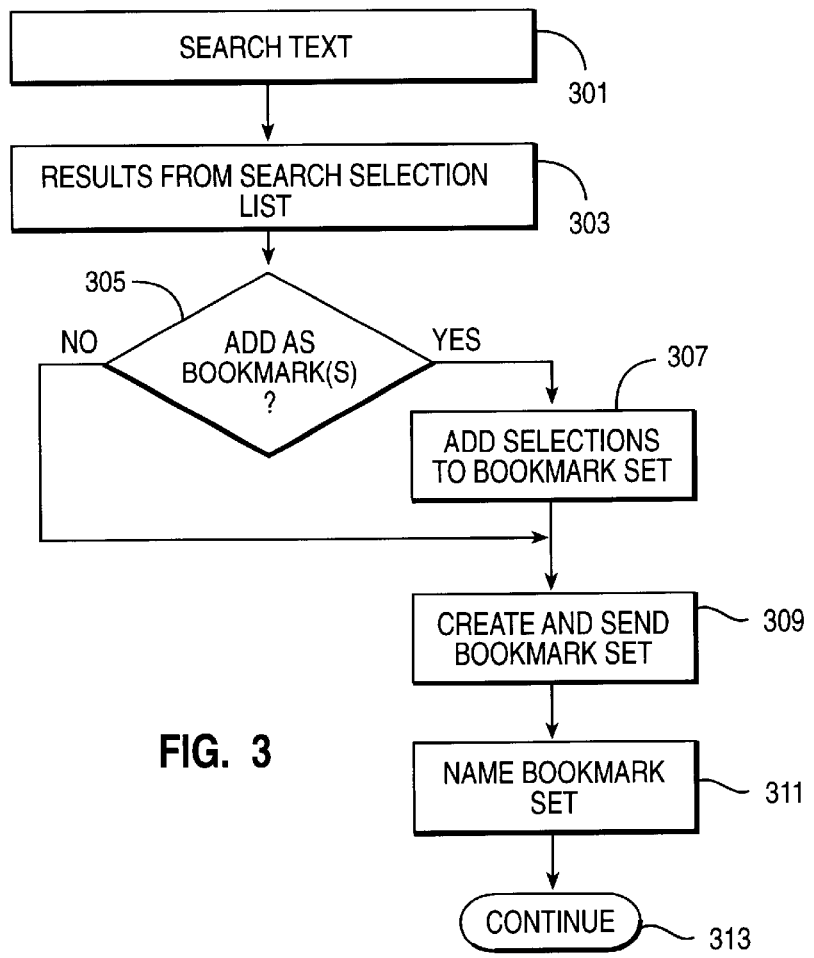
FIG. 3 shows a diagram of the overall process for searching, creating and serving a bookmark set in a distributed database environment.

The overall process is depicted in FIG. 3. In step 301, a search process for a bookmark set has begun. This step is initiated by the browser's retrieval of a search web page from a search server. A generalized search server, e.g., www.yahoo.com, could be used. This is discussed below in alternative embodiments of the invention. However, it is most straightforward to the user, if a special search server, e.g., www.bookmarkset.com, were used. Typically, search text is entered into the form in the web page and a button in the page is clicked at the conclusion of user input. From the user input, an HTTP request, e.g., http:/search.bookmarkset.com/bin/search?p=patents, is generated and sent to the search server.

Figure 4:
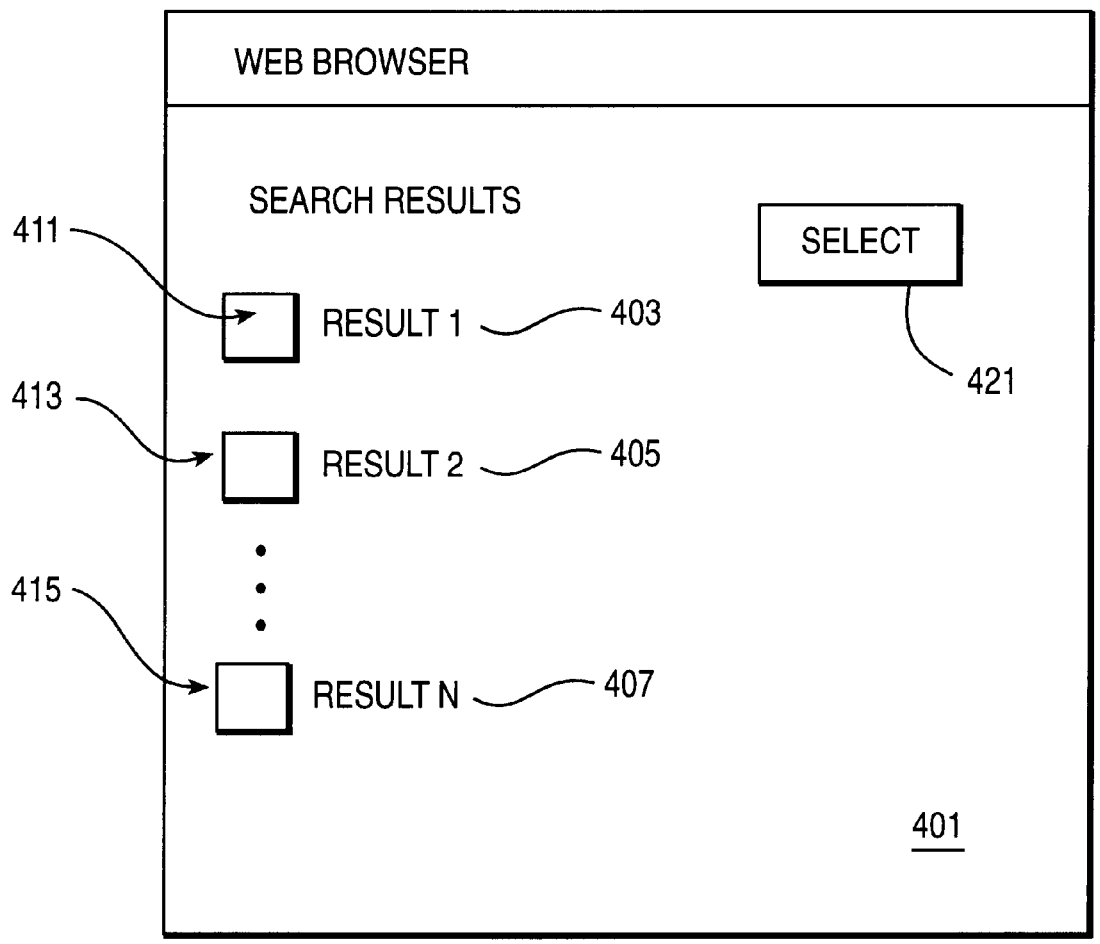
FIG. 4 shows a sample user interface for selecting URLs for a bookmark set.

The search server returns an HTML page containing the search results to the requesting client in step 303. The web page is parsed by the browser for presentation to the user. As mentioned above, the process for constructing, parsing and presenting a web page in HTML through the use of a browser is well known. The web page presented to the user is similar to those returned by other search engines and contains items such as the URL, title and summary of the web page. In addition, the web page also includes some graphical feature, such as a checkbox, to include a selected web page in the current or new bookmark set. One possible user interface is shown in FIG. 4.

In step 305, a scan is performed to determine whether the user has selected any of the checkboxes to include the corresponding web page in the bookmark set. As the user selects the checkboxes, the corresponding URLs are added to the bookmark set, step 307. When the user has indicated he has finished, e.g., by actuating a "select" button on the search page, a request, e.g., http:/search.bookmarkset.com/bin/bookmarkset?p=URL1,URL2, is sent to the bookmark set server. The server then creates a bookmark set and sends the bookmark set to the client browser.

As part of the bookmark set creation process, the bookmark set server can prioritize and order the bookmarks according to a certain criteria. For example, the bookmarks can be prioritized in the order that the selected search results match the search query. In this way, the results which best match the user's query are at the top of the bookmark set, and therefore, most easily accessed. As another example, certain web content providers may pay to have their URLs given higher priority in the bookmark set. If so, the URLs of paying providers would gain higher priority. Further, a limited number of URLs could be added to the bookmark set which were not selected by the user. Again, it is envisioned that the web content providers would pay to have their URLs included in bookmark sets created from a predetermined set of search criteria.

In the figure, it is assumed that a new bookmark set is being created. Therefore, a naming step 311 is included to add the name by which the new bookmark set will be known to the bookmark set manager in the collection of bookmark sets stored at the browser. However, the invention can also be used to add bookmarks to an already created bookmark set. This can be accomplished by making an existing bookmark set the active bookmark set and indicating to the bookmark set manager on reception of the newly created bookmark set from the server that the newly created bookmark set should be incorporated in the active bookmark set. Once the bookmark set is received, other processing continues, step 313.

In FIG. 4, one preferred user interface is portrayed. The web browser window 401 presents the search page to the user. A set of search results 403, 405 and 407 are included. As discussed above, each search result can include a URL, web page title, sponsoring organization and web page summary. Beside each search result, a corresponding checkbox 411, 413 and 415 is presented. The select button 421 causes the selected search results to be incorporated into a bookmark page returned to the user. Features of the browser window such as toolbars, menus and scroll bars are well known and omitted from the figure for ease of illustration.

The bookmark set itself primarily contains the URLs to a selected set of web pages. Generally, each bookmark is associated with the descriptive text so that a user can understand the general content of the page without actually retrieving the page. In the bookmark set creation process, the bookmark server can use the information returned with the search results for the descriptive matter. Other information such as keywords or an abstract could be included in the bookmark set entry of the present invention. An editing tool can be added to the browser to edit generated bookmark sets.

A sample bookmark set for "patent law" or "patent lawyer" follows:

| | |
|---|---|
| www.iplaw.com | Intellectual Property Law |
| www.iplaw.com/pat/index/html | Patent page |
| www.iplaw.com/copy/index/html | Copyright page |
| www.iplaw.com/mark/index/html | Trademark page |
| www.uspto.gov | US Patent Office |
| cweb.loc.gov | Copyright Office |
| www.smartrwe.com | Law firm |

The majority of the bookmark set includes URLs to useful articles and links to Intellectual Property sites. An "advertising" bookmark, www.smartrwe.com, for a law firm providing intellectual property services is also included in the bookmark set.

As mentioned above, the search page may originate from a general purpose search engine, e.g., www.yahoo.com, rather than a search page from the bookmark set server itself. In this situation, if the operators of the general purpose search engine did not support bookmark sets, an intermediate proxy server could be used. The client would make the initial request to the proxy server which would forward an HTTP request on behalf of the client to the search engine server. The search engine results would be returned to the proxy server, as it originated the HTTP request to the search engine. The proxy server would then insert the HTML for the check boxes in the search page retrieved from the search engine. The proxy server would cache the search results for future reference. Next, the client browser would return another HTTP request to the proxy server based on the selections of the user. The proxy server would then create the bookmark set and serve it to the client. Since the indexing of web pages in the Internet is a considerable effort, it can be preferred to use the general search engine results rather create yet another search engine.

From a user interface standpoint, it is a single step process to add a bookmark set to a browser in an easy, automatic and painless way. A special tag or MIME type can identify the nature of the file, i.e. a bookmark set, to be transferred. The bookmark set manager in the browser uses these tags or MIME types to add the bookmark set to the browser's collection of bookmarks. In one preferred embodiment, upon receipt of the new bookmark set, the bookmark set manager makes the new set the active bookmark set and thus rendering the included URLs available for browser use immediately.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:
1. A method for creating a bookmark set, comprising the steps of:
   sending a search request from a client browser for pages in a distributed database which satisfy a search condition;
   presenting a set of pages which satisfy the search condition, each page associated with a user input sensitive selection means;
   responsive to user input at the client browser wherein respective pages of the set are selected, creating a bookmark set including individual bookmarks for each of the selected pages; and
   sending the bookmark set as a unit to the client browser.
2. The method as recited in claim 1, further comprising the step of ordering the pages according to how well each page satisfies the search condition.
3. The method as recited in claim 1 wherein the client browser has a single active bookmark set of a plurality of available bookmark sets, further comprising the step of making the bookmark set of the selected pages the active bookmark set for the client browser.
4. The method as recited in claim 1, further comprising the step of inserting sponsored bookmarks into the bookmark set prior to serving the bookmark set to the client browser.
5. The method as recited in claim 1, further comprising the steps of:
   intercepting the search request by a proxy server;
   sending the search request to a search engine by the proxy server;
   returning the set of pages from the search engine to the proxy server;
   at the proxy server, constructing a web page including the set of pages and the user input sensitive selection means; and
   sending the constructed web page to the client browser.
6. The method as recited in claim 5, further comprising the step responsive to user selection of respective user input sensitive selection means corresponding to respective ones of the set of pages, sending one or more requests to the proxy server wherein the proxy server, according to the one or more requests, creates the bookmark set.
7. The method as recited in claim 1 wherein the bookmark set is designated by a special MIME type so that the bookmark set is loaded into the browser automatically.
8. A system including processor and memory for creating a bookmark set, comprising:
   means for sending a search request from a client browser for pages in a distributed database which satisfy a search condition;
   means for presenting a set of pages which satisfy the search condition, each page associated with a user input sensitive selection means;
   means responsive to user input at the client browser wherein respective pages of the set are selected, for creating a bookmark set including individual bookmarks for each of the selected pages; and
   means for sending the bookmark set as a unit to the client browser.
9. The system as recited in claim 8, further comprising means for ordering the pages according to how well each page satisfies the search condition.
10. The system as recited in claim 8 wherein the client browser has a single active bookmark set of a plurality of available bookmark sets, further comprising the step of making the bookmark set of the selected pages the active bookmark set for the client browser.

11. The system as recited in claim 8, further comprising means for inserting sponsored bookmarks into the bookmark set prior to serving the bookmark set to the client browser.

12. The system as recited in claim 8, further comprising:

a proxy server for intercepting the search request;

means for sending the search request to a search engine for performing the search request; and at the proxy server, means for constructing a web page including the set of pages and the user input sensitive selection means.

13. The system as recited in claim 12, wherein the means for constructing is responsive to requests from the client browser containing data related to user selection of respective user input sensitive selection means corresponding to respective ones of the set of pages.

14. The system as recited in claim 8 wherein the bookmark set is designated by a special MIME type so that the bookmark set is loaded into the browser automatically.

15. A computer program product in a computer readable medium for creating a bookmark-set, comprising:

means for sending a search request from a client browser for pages in a distributed database which satisfy a search condition;

means for presenting a set of pages which satisfy the search condition, each page associated with a user input sensitive selection means;

means responsive to user input at the client browser wherein respective pages of the set are selected for creating a bookmark set including individual bookmarks for each of the selected pages; and means for sending the bookmark set as a unit to the client browser.

16. The product as recited in claim 15, further comprising means for ordering the pages according to how well each page satisfies the search condition.

17. The product as recited in claim 15 wherein the client browser has a single active bookmark set of a plurality of available bookmark sets, further comprising means for automatically making the bookmark set of the selected pages the active bookmark set for the client browser.

18. The product as recited in claim 15, further comprising means for inserting sponsored bookmarks into the bookmark set prior to serving the bookmark set to the client browser.

19. A method for creating a bookmark set, comprising the steps of:

initiating a search request for pages in a distributed database which satisfy a search condition;

presenting a set of pages which satisfy the search condition at a client browser, each page associated with a user input sensitive selection means;

responsive to user input, creating a bookmark set including individual bookmarks to each selected page selected at the client browser; and installing the bookmark set as a unit into the client browser.

* * * * *